United States Patent
Kim et al.

(10) Patent No.: US 11,875,026 B2
(45) Date of Patent: Jan. 16, 2024

(54) METHOD AND SYSTEM FOR PROVIDING GRAPHIC OBJECT BASED ON DISPLAY MODE

(71) Applicant: LINE Plus Corporation, Seongnam-si (KR)

(72) Inventors: Yubin Kim, Seongnam-si (KR); Min Hwang, Seongnam-si (KR); Sangmo Goo, Seongnam-si (KR); Jihun Im, Seongnam-si (KR); Jay Lee, Seongnam-si (KR); Yeon Jin Jin, Seongnam-si (KR)

(73) Assignee: LINE Plus Corporation, Seongnam-si (KR)

( * ) Notice: Subject to any disclaimer, the term of this patent is extended or adjusted under 35 U.S.C. 154(b) by 66 days.

(21) Appl. No.: 17/575,817

(22) Filed: Jan. 14, 2022

(65) Prior Publication Data

US 2022/0229544 A1  Jul. 21, 2022

(30) Foreign Application Priority Data

Jan. 19, 2021 (KR) .......................... 10-2021-0007348

(51) Int. Cl.
| | |
|---|---|
| *G06F 3/04845* | (2022.01) |
| *G06F 3/04812* | (2022.01) |
| *G06F 3/04817* | (2022.01) |
| *G09G 5/02* | (2006.01) |
| *G09G 5/00* | (2006.01) |

(52) U.S. Cl.
CPC ...... *G06F 3/04845* (2013.01); *G06F 3/04812* (2013.01); *G06F 3/04817* (2013.01); *G09G 5/005* (2013.01); *G09G 5/02* (2013.01); *G09G 2320/0686* (2013.01)

(58) Field of Classification Search
CPC ............. G06F 3/04845; G06F 3/04812; G06F 3/04817; G09G 5/02; G09G 5/005; G09G 2320/0686
See application file for complete search history.

(56) References Cited

U.S. PATENT DOCUMENTS

| | | | | |
|---|---|---|---|---|
| 10,319,116 | B1* | 6/2019 | C | G09G 5/377 |
| 11,409,402 | B1* | 8/2022 | Cole | G06F 3/04815 |
| 2003/0130990 | A1* | 7/2003 | Brown | G06F 40/103 |
| 2018/0004404 | A1* | 1/2018 | Delfino | G06F 3/04847 |
| 2018/0039608 | A1* | 2/2018 | Sharifi | G06F 40/189 |
| 2018/0165837 | A1* | 6/2018 | Horn | G06T 7/12 |
| 2019/0021156 | A1* | 1/2019 | Julian | G01S 19/13 |
| 2019/0035321 | A1* | 1/2019 | Xu | G06T 11/001 |
| 2022/0121357 | A1* | 4/2022 | Kim | G06F 3/0488 |

* cited by examiner

*Primary Examiner* — Ting Z Lee
(74) *Attorney, Agent, or Firm* — Sughrue Mion, PLLC

(57) ABSTRACT

A method for providing a graphic object based on a display mode, may include receiving the graphic object, displaying the graphic object on a display of the user terminal, detecting a change of the display mode of the user terminal from a first display mode to a second display mode, and in response to detecting the change of the display mode of the user terminal from the first display mode to the second display mode, changing a color of at least a portion of the graphic object.

19 Claims, 11 Drawing Sheets

510

520

530

METHOD AND SYSTEM FOR PROVIDING GRAPHIC OBJECT BASED ON DISPLAY MODE

CROSS-REFERENCE TO RELATED APPLICATION

This application claims priority to Korean Patent Application No. 10-2021-0007348, filed in the Korean Intellectual Property Office on Jan. 19, 2021, the disclosure of which is incorporated herein by reference in its entirety.

BACKGROUND

Field

Apparatuses and methods consistent with example embodiments relate to providing a graphic object based on a display mode of an electronic device, and more particularly, to changing a color of the graphic object according to the display mode.

Description of Related Art

With the proliferation of mobile devices such as smartphones or the like and the development of the Internet, instant messaging services using mobile devices are widely used. Users of instant messaging services can naturally communicate and chat with each other in everyday life. The users may use graphic objects such as stickers, emoticons, and the like to effectively communicate their emotions.

Meanwhile, users may change the color themes of the smartphones or instant messaging applications according to their preferences. For example, users may change the color themes to reduce eye strain or reduce the power consumption of smartphones. However, when the color theme is changed, a problem may arise when it is difficult for users to normally identify graphic objects such as stickers, emoticons, and the like due to the changed color theme.

SUMMARY

Example embodiments address at least the above problems and/or disadvantages and other disadvantages not described above. Also, the example embodiments are not required to overcome the disadvantages described above, and may not overcome any of the problems described above.

One or more example embodiments provide a method, a non-transitory computer-readable recording medium storing instructions, and a system (device) for providing a graphic object based on a display mode.

Example embodiments of the present disclosure may be implemented in a variety of ways, including a method, a system (device), or a non-transitory computer-readable recording medium storing instructions.

According to an aspect of the present disclosure, a method for providing a graphic object based on a display mode, may be performed by at least one processor of a user terminal and may include: receiving the graphic object; displaying the graphic object on a display of the user terminal; detecting a change of the display mode of the user terminal from a first display mode to a second display mode; and in response to detecting the change of the display mode of the user terminal from the first display mode to the second display mode, changing a color of at least one portion of the graphic object. The changing the color of the at least one portion of the graphic object may include: displaying a color change icon for changing the color of the at least one portion of the graphic object; receiving a user input for selecting the color change icon; and changing the color of the at least one portion based on the user input.

The color change icon may be displayed in response to determining that a theme color of the second display mode and the color of the at least one portion have a color difference equal to or less than a predetermined threshold value.

The graphic object may include a first graphic object for the first display mode and a second graphic object for the second display mode, the displaying the graphic object on the display of the user terminal may include displaying the first graphic object for the first display mode, and the changing the color of the at least one portion of the graphic object may include displaying the second graphic object for the second display mode.

The first display mode and the second display mode may have theme colors different from each other.

The changing the color of the at least one portion of the graphic object may include changing the color of the at least one portion of the graphic object to a color different from a theme color of the second display mode.

The color different from the theme color of the second display mode may have a complementary color relationship with the theme color of the second display mode.

The color of the at least one portion may have a color difference equal to or less than a predetermined threshold value from the theme color of the second display mode.

The changing the color of the at least one portion of the graphic object may include changing a color of a border area of the graphic object to a color different from a theme color of the second display mode.

The color of the border area of the graphic object may be changed to the color different from the theme color of the second display mode for a predetermined time, and then may return to the color before the change after the predetermined time.

The graphic object may include a text, and the method may further include changing a color of a border area of the text to a color different from a theme color of the second display mode.

The graphic object may be received through an instant messaging application, and the graphic object may be displayed in a chat room of the instant messaging application.

According to an example embodiment of the present disclosure, a method for providing a graphic object based on a display mode, may be performed by at least one processor of a user terminal and may include: receiving the graphic object for a first display mode; determining that the user terminal is operating in a second display mode; and in response to determining that the user terminal is operating in the second display mode, changing a color of at least one portion of the graphic object.

The changing the color of the at least one portion of the graphic object may include: displaying a color change icon for changing the color of the at least one portion of the graphic object; receiving a user input for selecting the color change icon; and changing the color of the at least one portion based on the user input.

The changing the color of the at least one portion of the graphic object may include changing the color of the at least one portion of the graphic object to a color different from a theme color of the second display mode.

The changing the color of the at least one portion of the graphic object may include changing a color of a border area of the graphic object to a color different from a theme color of the second display mode.

The graphic object may be received through an instant messaging application, and the graphic object may be displayed in a chat room of the instant messaging application.

According to another aspect of the present disclosure, a non-transitory computer-readable recording medium may store instructions that, when executed by the at least one processor, cause the at least one processor to perform the method for providing the graphic object based on the display mode.

According to another aspect of the present disclosure, a user terminal may include: a display; a memory storing computer-readable instructions; and at least one processor configured to execute the computer-readable instructions to: receive a graphic object; display the graphic object on the display; detect a change of a display mode of the user terminal from a first display mode to a second display mode; and in response to detecting the change of the display mode of the user terminal from the first display mode to the second display mode, change a color of at least one portion of the graphic object.

The changing the color of the at least one portion of the graphic object may include: displaying a color change icon for changing the color of the at least one portion of the graphic object; receiving a user input for selecting the color change icon; and changing the color of the at least one portion based on the user input.

In various embodiments of the present disclosure, the color of the graphic object can be changed and displayed according to the display mode, and as a result, the user can clearly identify the received graphic object regardless of the theme color of the display mode.

In various embodiments of the present disclosure, the user can easily recognize that the content of the received graphic object may not be normally viewable in the current display mode.

In various embodiments of the present disclosure, the user is able to view in advance how the set of graphic objects the user is purchasing will be displayed in the light mode and the dark mode, respectively.

The effects of the present disclosure are not limited to the effects described above, and other effects not described can be clearly understood by those of ordinary skill in the art (referred to as "ordinary technician") from the description of the claims.

BRIEF DESCRIPTION OF THE DRAWINGS

The above and/or other aspects will be more apparent by describing certain example embodiments, with reference to the accompanying drawings, in which.

DETAILED DESCRIPTION

Figure 1:
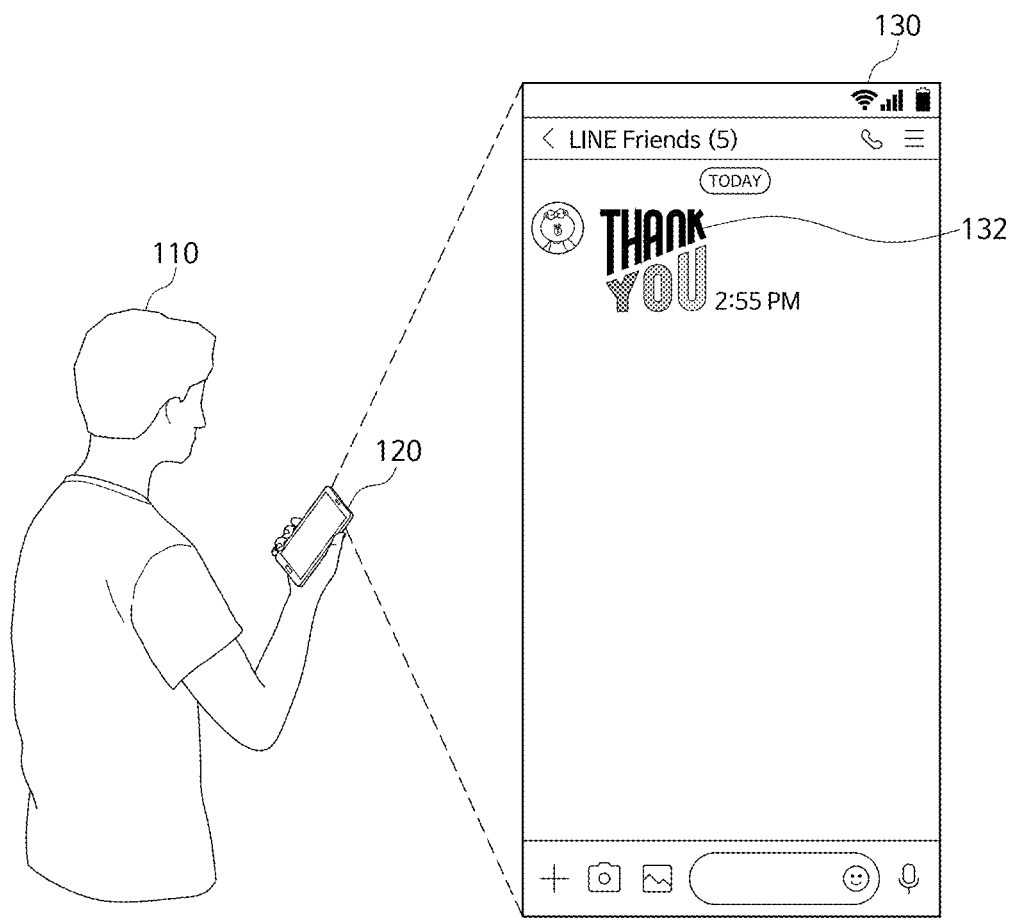
FIG. 1 illustrates an example in which a graphic object is provided through an instant messaging application operating in a user terminal according to an example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail Advantages and features of the disclosed embodiments and methods of accomplishing the same will be apparent by referring to embodiments described below in connection with the accompanying drawings. However, the present disclosure is not limited to the embodiments disclosed below, and may be implemented in various different forms, and the present embodiments are merely provided to make the present disclosure complete, and to fully disclose the scope of the invention to those skilled in the art to which the present disclosure pertains.

The terms used herein will be briefly described prior to describing the disclosed embodiments in detail. The terms used herein have been selected as general terms which are widely used at present in consideration of the functions of the present disclosure, and this may be altered according to the intent of an operator skilled in the art, conventional practice, or introduction of new technology. In addition, in specific cases, the term may be arbitrarily selected by the applicant, and the meaning of the term will be described in detail in a corresponding description of the embodiments. Therefore, the terms used in the present disclosure should be defined based on the meaning of the terms and the overall content of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it intends to mean that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to reproduce one or more processors. Accordingly, as an example, the "module" or "unit" may include components such as software components, object-oriented software components, class components, and task components, and at least one of processes, functions, attributes, procedures, subroutines, program code segments of program code, drivers, firmware, micro-codes, circuits, data, database, data structures, tables, arrays, and variables. Furthermore, functions provided in the components and the "modules" or "units" may be combined into a smaller number of components and "modules" or "units", or further divided into additional components and "modules" or "units."

According to an example embodiment, the "module" or "unit" may be implemented as a processor and a memory. The "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination of processing devices, e.g., a combination of a DSP and a microprocessor, a plurality of microprocessors, one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory integrated with the processor is in electronic communication with the processor.

In the present disclosure, a "chat room" may refer to a virtual space or group in which one or more users (or user accounts) may participate, which may be generated in an instant messaging application and the like installed on a computing device. For example, one or more user accounts may participate or be included in the chat room and exchange various types of messages, files, and the like. In addition, in the chat room, a Voice over Internet Protocol (VoIP) voice call function, a VoIP video call function, a live broadcast function (VoIP real-time video transmission function), and a graphic object function are provided, enabling voice calls, video calls, video streaming, graphic object transmission, and the like to be performed between user accounts.

In the present disclosure, a "user" may refer to a user of an instant messaging application or a user account of the instant messaging application. In this example, the user account may represent an account generated and used by the user in the instant messaging application or data related thereto.

In the present disclosure, a "display mode" may refer to a menu for changing a color of a user interface (e.g., a background color of a chatroom interface) displayed on a user terminal. An operating system of the user terminal may provide a display mode function, and/or an instant messaging application operating in the user terminal may provide a display mode function. The display mode may be changed using a user interface, or a screen brightness control button or the like associated with the user terminal. For example, various display modes such as a light mode including dark colored texts, icons and graphic objects on a light colored background, a dark mode including light colored texts, icons and graphic objects on a dark colored background, and the like may be provided. The theme color of the display mode may refer to a main color of the background provided in the corresponding display mode.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

While such terms as "first," "second," etc., may be used to describe various elements, such elements must not be limited to the above terms. The above terms may be used only to distinguish one element from another.

FIG. 1 illustrates an example in which a graphic object 132 is provided through an instant messaging application operating in a user terminal 120 according to an example embodiment. A user 110 may use the user terminal 120 to exchange messages with another user of the instant messaging application. In an example embodiment, the user 110 may exchange text messages, voice messages, video messages, emoticons, graphic objects (e.g., the graphic object 132), and the like with another user through the instant messaging application.

In an example embodiment, the user 110 may view the graphic object 132 transmitted by another user through a chat room interface 130. The graphic object 132 used herein is to visually communicate the user's emotions or feelings, and may include emoticons, emojis, animojis, stickers, images, and the like, and may include one or more portions displayed in different colors. The graphic object 132 may include shapes, texts, pictures, and the like, for example.

In an example embodiment, the user 110 may change the display mode (e.g., light mode, dark mode, medium mode, and the like) of the user terminal 120 or the instant messaging application. In addition, the display mode may include a first display mode, a second display mode, and the like, and each display mode may have theme colors different from each other. For example, the first display mode (e.g., light mode) may have a white theme color (e.g., a white background color), and the second display mode (e.g., dark mode) may have a black theme color (e.g., a black background color).

When the graphic object 132 is designed for the first display mode, changing the display mode of the user terminal 120 or the instant messaging application to the second display mode may result in difficulty for the user 110 to identify all or portion of the graphic object 132. For example, when the color of all or portion of the graphic object 132 is the same as or similar to the theme color of the second display mode, it may be difficult for the user 110 to normally identify the graphic object 132.

In an example embodiment, when the user 110 changes the first display mode to the second display mode, the color of all or portion of the graphic object 132 may be changed and displayed on the chat room interface 130. For example, when the changed theme color of the second display mode and the color of at least a portion of the graphic object 132 are the same or similar to each other, the color of the corresponding portion of the graphic object 132 may be changed and displayed on the chat room interface 130. With such a configuration, the color of the graphic object 132 can be changed and displayed according to the display mode, and as a result, the user 110 can clearly identify the received graphic object 132 regardless of the theme color of the display mode.

Figure 2:
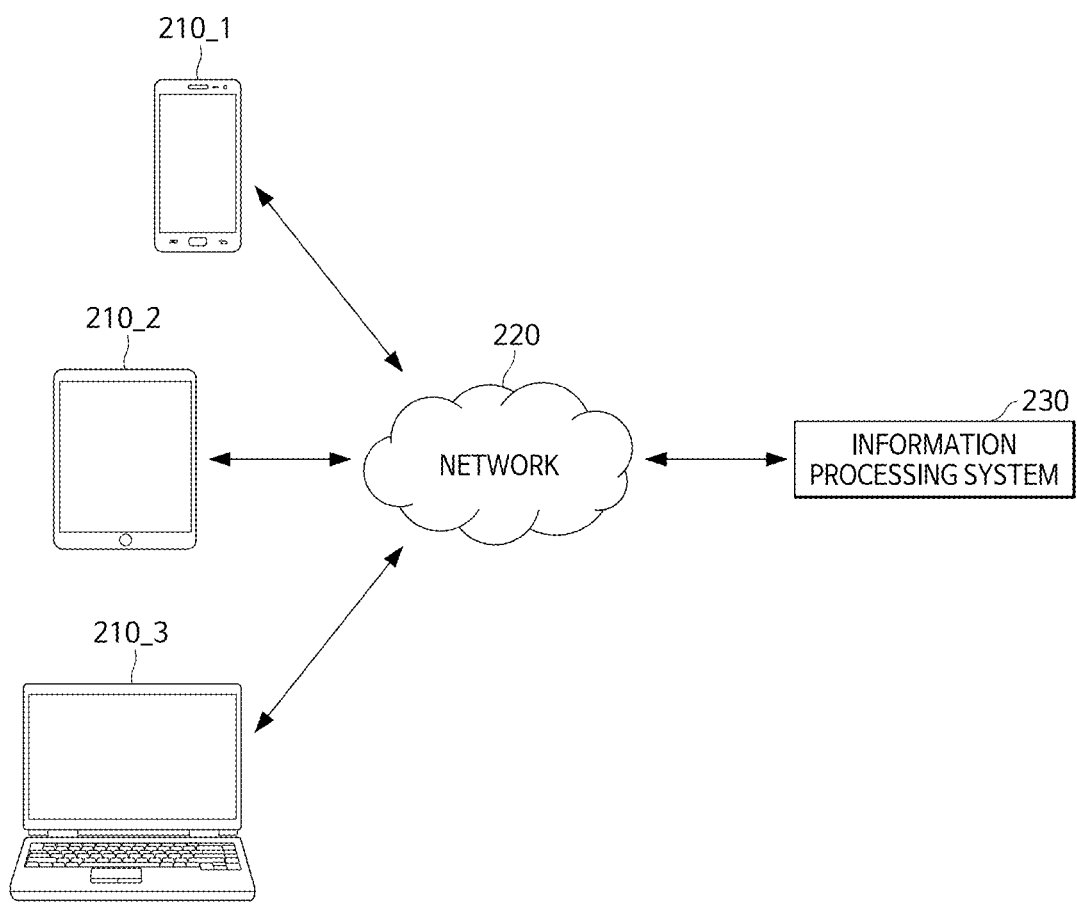
FIG. 2 is a schematic diagram illustrating a configuration in which an information processing system is communicatively connected to a plurality of user terminals in order to provide a service for providing a graphic object based on a display mode according to an example embodiment.

FIG. 2 is a schematic diagram illustrating a configuration in which an information processing system 230 is communicatively connected to a plurality of user terminals 210_1, 210_2, and 210_3 to provide a service for providing a graphic object based on a display mode according to an example embodiment. The information processing system 230 may include system(s) capable of providing, through a network 220, instant messaging services including the service for providing a graphic object based on a display mode (e.g., service for changing/providing the color of a graphic object based on a display mode). According to an example embodiment, the information processing system 230 may include one or more server devices and/or databases, or one or more distributed computing devices and/or distributed databases based on cloud computing services, which are capable of storing, providing and executing computer-executable programs (e.g., downloadable applications) and data related the instant messaging service and provision of the display mode based the graphic object. For example, the information processing system 230 may include separate systems (e.g., servers) for providing the service for providing a graphic object based on a display mode and/or the instant messaging service.

The instant messaging service provided by the information processing system 230 may be provided to the user through the instant messaging application or the like installed in each of the plurality of user terminals 210_1, 210_2, and 210_3. For example, the instant messaging service may include a text messaging service, a voice messaging service, a video call service, a voice call service, a video streaming service, a service for changing/providing the color of a graphic object based on a display mode, and the like, between users of the instant messaging application.

The plurality of user terminals 210_1, 210_2, and 210_3 may communicate with the information processing system 230 through the network 220. The network 220 may be configured to enable communication between the plurality of user terminals 210_1, 210_2, and 210_3 and the information processing system 230. The network 220 may be configured as a wired network such as Ethernet, a wired home network (Power Line Communication), a telephone line communication device and RS-serial communication, a wireless network such as a mobile communication network, a wireless LAN (WLAN), Wi-Fi, Bluetooth, and ZigBee, or a combination thereof, depending on the installation environment. The method of communication is not limited, and may include a communication method using a communication network (e.g., mobile communication network, wired Internet, wireless Internet, broadcasting network, satellite network, and so on) that may be included in the network 220 as well as short-range wireless communication between the user terminals 210_1, 210_2 and 210_3.

In FIG. 2, a mobile phone terminal 210_1, a tablet terminal 210_2, and a PC terminal 210_3 are illustrated as the examples of the user terminals, but embodiments are not limited thereto, and the user terminals 210_1, 210_2 and 210_3 may be any computing device that is capable of wired and/or wireless communication and that can be installed with the instant messaging application and so on and execute the same. For example, the user terminal may include a smartphone, a mobile phone, a navigation system, a computer, a notebook computer, a digital broadcasting terminal, Personal Digital Assistants (PDA), a Portable Multimedia Player (PMP), a tablet PC, a game console, a wearable device, an internet of things (IoT) device, a virtual reality (VR) device, an augmented reality (AR) device, and the like. In addition, FIG. 2 illustrates that three user terminals 210_1, 210_2, and 210_3 are in communication with the information processing system 230 through the network 220, but embodiments are not limited thereto, and a different number of user terminals may be configured to be in communication with the information processing system 230 through the network 220.

In an example embodiment, the information processing system 230 may receive a graphic object from the user terminal 210_1, 210_2, and 210_3. In this case, the received graphic object may be transmitted to the other user terminals 210_1, 210_2, and 210_3 (e.g., the terminals of the other users included in the same chat room as the user who transmitted the graphic object) through the instant messaging application or the like. In this case, the information processing system 230 may transmit the graphic object after changing the color of at least a portion of the graphic object according to the display mode of the user terminals 210_1, 210_2, and 210_3 on the receiving side of the graphic object. Additionally or alternatively, the user terminals 210_1, 210_2, and 210_3 on the receiving side may display the received graphic object differently on the display according to the display mode.

Figure 3:
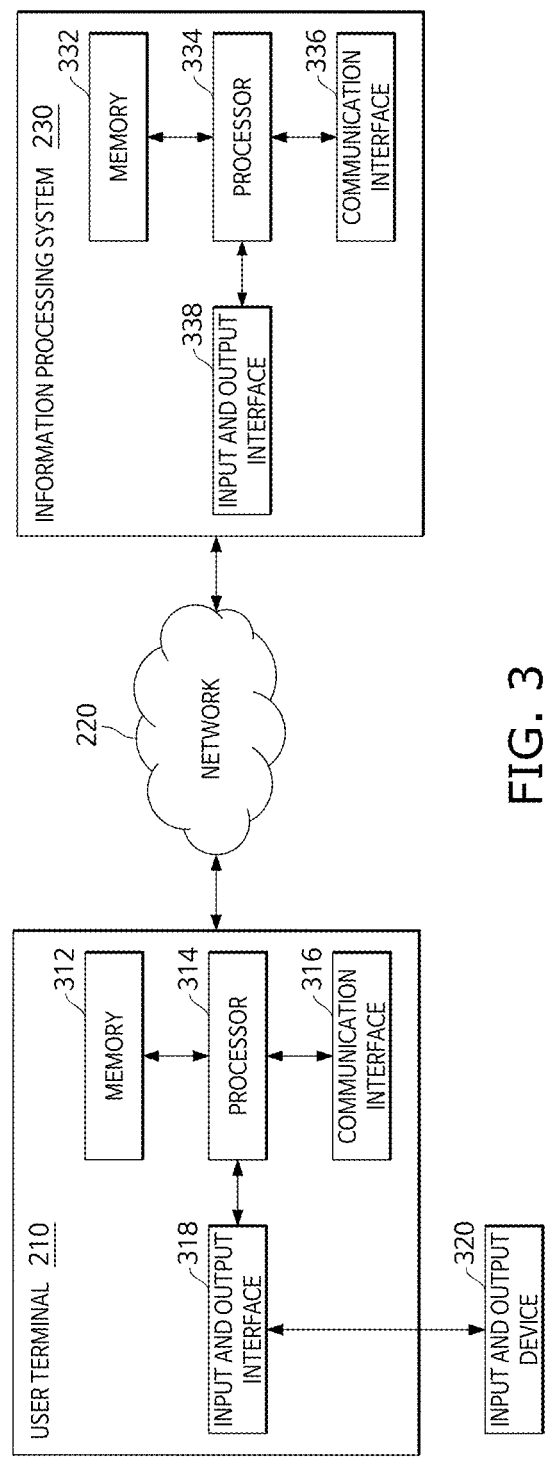
FIG. 3 is a block diagram illustrating an internal configuration of the user terminal and the information processing system according to an example embodiment.

FIG. 3 is a block diagram illustrating an internal configuration of the user terminal 210 and the information processing system 230 according to an example embodiment. The user terminal 210 may refer to any computing device that is capable of executing the instant messaging application and so on and also capable of wired/wireless communication, and may include the mobile phone terminal 210_1, the tablet terminal 210_2, and the PC terminal 210_3 of FIG. 2, for example. As illustrated, the user terminal 210 may include a memory 312, a processor 314, a communication interface 316, and an input and output interface 318. Likewise, the information processing system 230 may include a memory 332, a processor 334, a communication interface 336, and an input and output interface 338. As illustrated in FIG. 3, the user terminal 210 and the information processing system 230 may be configured to communicate information and/or data through the network 220 using the respective communication interfaces 316 and 336. In addition, an input and output device 320 may be configured to input information and/or data to the user terminal 210 or to output information and/or data generated from the user terminal 210 through the input and output interface 318.

The memories 312 and 332 may include any non-transitory computer-readable recording medium. According to an example embodiment, the memories 312 and 332 may include a permanent mass storage device such as random access memory (RAM), read only memory (ROM), disk drive, solid state drive (SSD), flash memory, and so on. As another example, a non-destructive mass storage device such as ROM, SSD, flash memory, disk drive, and so on may be included in the user terminal 210 or the information processing system 230 as a separate permanent storage device that is distinct from the memory. In addition, an operating system and one or more program codes (e.g., a code for the instant messaging application, and the like installed and driven in the user terminal 210) may be stored in the memories 312, 332.

These software components may be loaded from a computer-readable recording medium separate from the memories 312 and 332. Such a separate computer-readable recording medium may include a recording medium directly connectable to the user terminal 210 and the information processing system 230, and may include a computer-readable recording medium such as a floppy drive, a disk, a tape, a DVD/CD-ROM drive, a memory card, and so on, for example. As another example, the software components may be loaded into the memories 312 and 332 through the communication interfaces 316 and 336 rather than the computer-readable recording medium. For example, one or more programs may be loaded into the memories 312 and 332 based on a computer program (e.g., an application that provides the instant messaging service or the service for changing/providing the color of a graphic object based on a display mode) that is installed by the files provided by the developers or a file distribution system for distributing an installation file of the application through the network 220.

The processors 314 and 334 may be configured to process the instructions of the computer program by performing basic arithmetic, logic, and input and output operations. The instructions may be provided to the processors 314 and 334 from the memories 312 and 332 or the communication interfaces 316 and 336. For example, the processors 314 and 334 may be configured to execute the received instructions according to program code stored in a recording device such as the memories 312 and 332.

The communication interfaces 316 and 336 may provide a configuration or function for the user terminal 210 and the information processing system 230 to communicate with each other through the network 220, and may provide a configuration or function for the user terminal 210 and/or the information processing system 230 to communicate with another user terminal or another system (e.g., a separate cloud system or the like). For example, a request or data (e.g., a request to transmit a graphic object, and the like) generated by the processor 314 of the user terminal 210 according to the program code stored in the recording device such as the memory 312 or the like may be transmitted to the information processing system 230 through the network 220 under the control of the communication interface 316. Conversely, a control signal or a command provided under the control of the processor 334 of the information processing system 230 may be received by the user terminal 210 through the communication interface 316 of the user terminal 210 via the communication interface 336 and the network 220. For example, the user terminal 210 may receive a graphic object and the like from the information processing system 230.

The input and output interface 318 may be a means for interfacing with the input and output device 320. As an example, the input device may include a device such as a camera, a keyboard, a microphone, a mouse, and so on, which includes an audio sensor and/or an image sensor, and the output device may include a device such as a display, a speaker, a haptic feedback device, and so on. As another example, the input and output interface 318 may be a means for interfacing with a device, such as, for example, a touch screen or the like that integrates a configuration or function for performing inputting and outputting.

While FIG. 3 illustrates that the input and output device 320 is not included in the user terminal 210, embodiments are not limited thereto, and the input and output device 320 may be configured as one device with the user terminal 210. In addition, the input and output interface 338 of the information processing system 230 may be a means for interfacing with a device (not illustrated) for inputting or outputting, which may be connected to the information processing system 230 or included in the information processing system 230. In FIG. 3, while the input and output interfaces 318 and 338 are illustrated as the components configured separately from the processors 314 and 334, embodiments are not limited thereto, and the input and output interfaces 318 and 338 may be configured to be included in the processors 314 and 334.

The user terminal 210 and the information processing system 230 may include more components than the components illustrated in FIG. 3. Meanwhile, most of the related components may not necessarily require exact illustration. According to an example embodiment, the user terminal 210 may be implemented to include at least a part of the input and output devices 320 described above. In addition, the user terminal 210 may further include other components such as a transceiver, a Global Positioning System (GPS) module, a camera, various sensors, a database, and the like. For example, when the user terminal 210 is a smartphone, it may generally include components included in the smartphone, and for example, it may be implemented such that various components such as an acceleration sensor, a gyro sensor, a microphone module, a camera module, various physical buttons, buttons using a touch panel, input and output ports, a vibrator for vibration, and so on are further included in the user terminal 210.

In an example embodiment, the processor 314 of the user terminal 210 may be configured to operate an instant messaging application or web browser application providing the instant messaging service including the service for providing a graphic object based on a display mode. In this case, the program code associated with the corresponding application may be loaded into the memory 312 of the user terminal 210. While the application is running, the processor 314 of the user terminal 210 may receive information and/or data provided from the input and output device 320 through the input and output interface 318 or receive the information and/or data from the information processing system 230 through the communication interface 316, and process the received information and/or data and store it in the memory 312. In addition, such information and/or data may be provided to the information processing system 230 through the communication interface 316.

While the instant messaging application is running, the processor 314 may receive voice data, text, image, video, and the like input or selected through the input device such as a camera, a microphone, and the like that includes a touch screen, a keyboard, an audio sensor and/or an image sensor connected to the input and output interface 318, and store the received voice data, text, image, and/or video or the like in the memory 312, or provide it to the information processing system 230 through the communication interface 316 and the network 220. According to an example embodiment, the processor 314 may receive a request to transmit a graphic object from a user through an input device, and provide the corresponding data/request to the information processing system 230 through the network 220 and the communication interface 316.

The processor 334 of the information processing system 230 may be configured to manage, process, and/or store the information and/or data received from a plurality of user terminals and/or a plurality of external systems. In an example embodiment, the processor 334 may store, process, and transmit the graphic object and the like received from the user terminal 210. For example, the processor 334 may change the color of at least a portion of the graphic object according to the theme color of the display mode and transmit it to another user terminal. Additionally or alternatively, the processor 314 of the user terminal 210 may change the color of at least a portion of the graphic object according to the theme color of the display mode and display it on the display.

Figure 4:
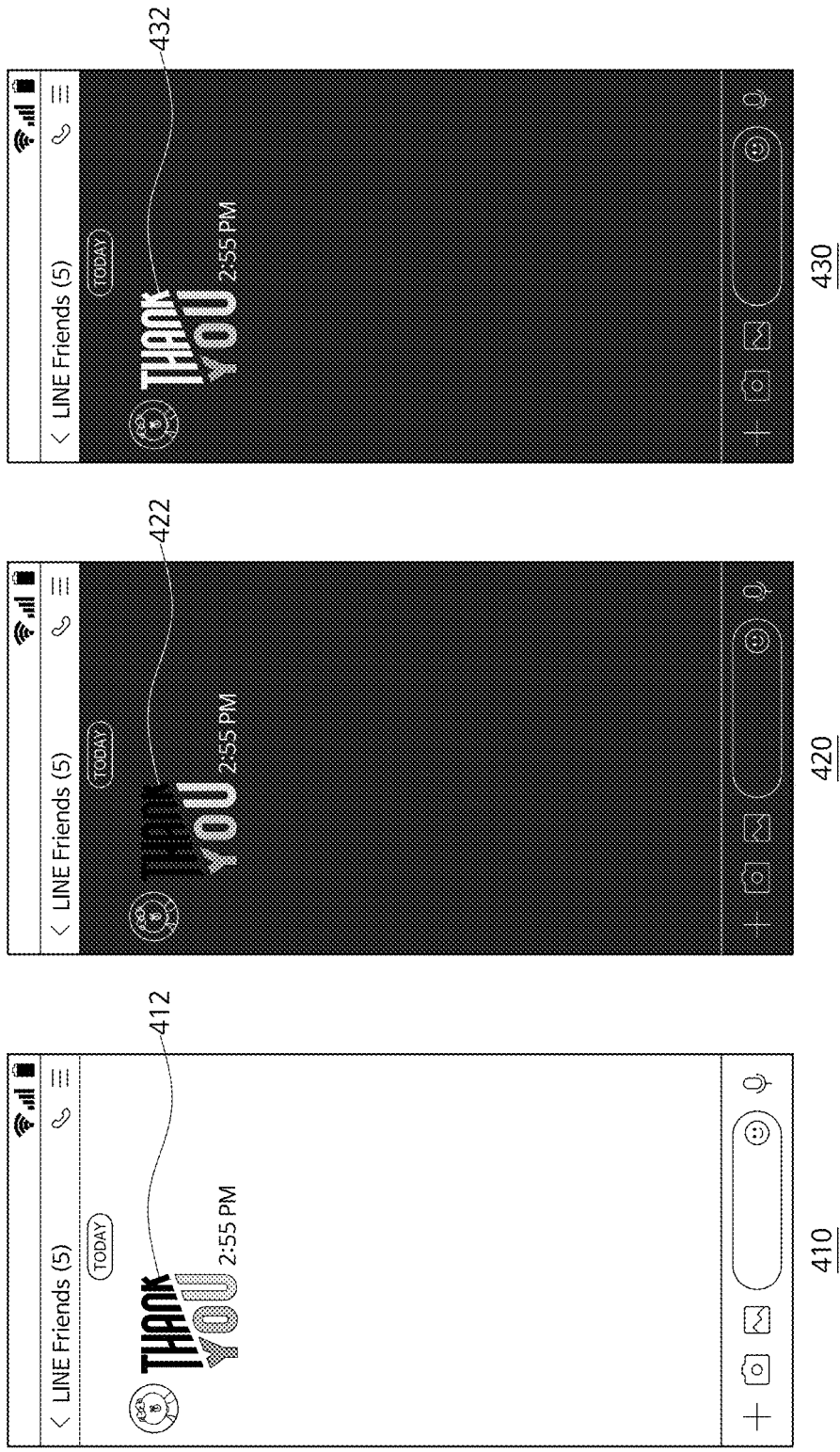
FIG. 4 illustrates an example in which a color of at least a portion of a graphic object is changed upon change of a display mode according to an example embodiment.

FIG. 4 illustrates an example in which a color of at least a portion of a graphic object is changed upon change of a display mode according to an example embodiment. The user may receive a graphic object transmitted by another user through a chat room on the instant messaging application. The graphic object may include characters, letters, numbers, symbols, a picture, a graphic image, or a chat bubble including any one or any combination of characters, letters, numbers, symbols, a picture, and a graphic image. In an example embodiment, through a first operation 410, a second operation 420, and a third operation 430, the user may view a graphic object changed in color at least partially according to the theme color of the display mode.

The first operation 410 illustrates an example in which a graphic object 412 received from another user is displayed on the display, while the user terminal or the instant messaging application is operating in the first display mode (e.g., light mode). For example, the first display mode may have a white theme color, and text may be displayed in black. As illustrated, the graphic object 412 may be a message including a sticker on which "THANK YOU" is designed.

The second operation 420 illustrates an example in which the display mode is changed from the first display mode to the second display mode (e.g., dark mode). For example, the second display mode may have a black theme color, and the text may be displayed in white. As described above, when the display mode is changed from the first display mode to the second display mode, the color of a portion (e.g., "THANK" portion) of a graphic object 422 is displayed in similar color to the theme color of the changed second display mode, which may make it difficult for the user to normally identify the graphic object 422.

The processor 314 of the user terminal 210 or the processor 334 of the information processing system 230 may determine whether the color of the graphic object 422 is similar to the background color of the chatroom based on an Euclidean distance between RGB colors (R1, G1, B1) of the graphic object 422 and RGB colors (R2, G2, B2) of the background within a color space, or a taxicab distance between a non-chromatic lightness and chromatic colors (L1, a1, b1) of the graphic object 422 and a non-chromatic lightness and chromatic colors (L2, a2, b2) of the background.

For example, the Euclidean distance may be calculated as follows:

$$\sqrt{(R2-R1)^2+(G2-G1)^2+(B2-B1)^2}$$

The taxicab distance may be calculated as follows:

$$\sqrt{(a2-a1)^2+(b2-b1)^2+|L2-L1|}$$

The processor 314 or the processor 334 may determine that the color of the graphic object 422 is similar to the background color of the chatroom when the Euclidean distance or the taxicab distance is less than or equal to a predetermined threshold. The method of computing the similarity between two colors is not limited to the method of calculating the Euclidean distance or the taxicab distance, and other similarity calculation methods may be used.

The processor 314 or the processor 334 may proceed to the third operation 430 when the color of the graphic object 422 is determined to be similar to the background color of the chatroom. The third operation 430 illustrates an example in which the color of the portion of the graphic object 422 having the similar color to the theme color of the second display mode is changed. In this case, the color of the portion of the graphic object 422 may be automatically changed to a color different from the theme color of the second display mode and displayed. For example, the color of a portion of the graphic object 422 may be changed to a color having a complementary color relationship with the theme color of the second display mode and displayed. In an example embodiment, the color of the portion of the graphic object 422 may be automatically changed to a color different from the theme color of the second display mode for a predetermined time (e.g., 1 second, 3 seconds, 5 seconds, and the like) and then may automatically return to the color before the change after the predetermined time is elapsed. The user is able to normally identify a graphic object 432 in the changed color in the second display mode.

In an example embodiment, the graphic object may include a graphic object for a first display mode and a graphic object for a second display mode. That is, the graphic object may include the graphic object 412 previously generated for the first display mode and the graphic object 432 previously generated for the second display mode. In this case, one of the graphic object 412 for the first display mode and the graphic object 432 for the second display mode may be displayed according to the display mode of the user terminal or the instant messaging application.

In an example embodiment, when the color of at least a portion of the graphic object 412 has a color difference equal to or less than a predetermined threshold value from the theme color of the display mode, the color of the corresponding portion may be changed to a color different from the theme color of the display mode. For example, the color of the portion of the graphic object 412 may be changed to a color having a complementary color relationship with the theme color of the second display mode and displayed.

FIG. 4 illustrates that the graphic object 432 in the changed color is displayed on the display through the first operation 410, the second operation 420, and the third operation 430, but embodiments are not limited thereto, and the second operation 420 may be omitted. In addition, while FIG. 4 illustrates that the color of the graphic object 422 is changed upon detecting the change from the first display mode (e.g., light mode) to the second display mode (e.g., dark mode), embodiments are not limited thereto. For example, when the graphic object for the first display mode (e.g., light mode) is received while the user terminal or the instant messaging application is operating in the second display mode (e.g., dark mode), the color of at least a portion of the graphic object for the second display mode may be changed and displayed on the display. In addition, although it has been described above that there are two display modes in FIG. 4, embodiments are not limited thereto, and three or more display modes having different theme colors may be provided.

Figure 5:
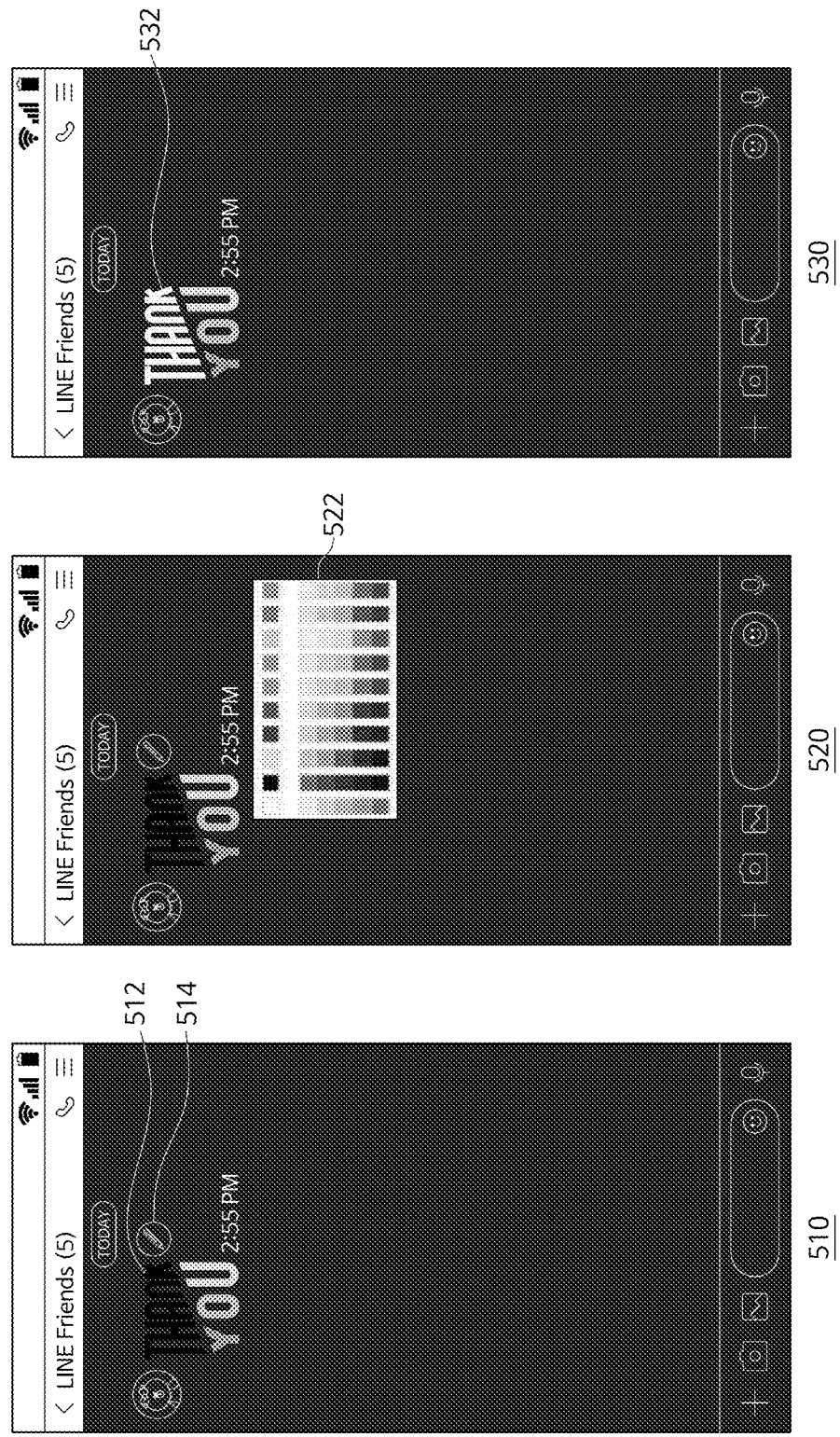
FIG. 5 illustrates an example in which the user changes a color of at least a portion of a graphic object according to an example embodiment.

FIG. 5 illustrates an example in which the user changes a color of at least a portion of a graphic object according to an example embodiment. The user may receive a graphic object transmitted by another user through the chat room on the instant messaging application. In this case, through a first operation 510, a second operation 520, and a third operation 530, the user may change the color of at least a portion of the received graphic object.

The first operation 510 illustrates an example in which a graphic object 512 received from another user is displayed on the display together with a color change icon 514, while the user terminal or the instant messaging application is operating in the second display mode (e.g., dark mode). In this case, the second display mode may have a black theme color, and the text may be displayed in white. In addition, the graphic object 512 may be a sticker on which "THANK YOU" is designed, and the color of each text portion may be displayed differently. For example, the color of the "THANK" portion of the graphic object 512 may be displayed similarly to the theme color of the second display mode.

In the illustrated example, the color change icon 514 capable of changing the color of at least a portion of the graphic object 512 may be displayed together with the graphic object 512. In an example embodiment, the color change icon 514 may be displayed adjacent to a portion having a color difference equal to or less than a predetermined threshold value from the theme color of the second display mode. For example, when it is determined that the color of the "THANK" portion of the graphic object 512 has a color difference equal to or less than the predetermined threshold value from the theme color of the second display mode, the color change icon 514 may be displayed adjacent to the "THANK" portion of the graphic object 512. Alternatively, the color change icon 514 may be displayed for each portion of the graphic object 512.

The second operation 520 represents an example of displaying a color selection table 522 for selecting a new color when the user selects the color change icon 514 by a touch input or the like. For example, the user may select one of the colors displayed in the color selection table 522 by a touch input or the like, and change the color of the "THANK" portion of the graphic object 512 to the selected color. In FIG. 5, although it is illustrated that the color selection table 522 is displayed when the user selects the color change icon 514, embodiments are not limited thereto. For example, the user may directly input the RGB value of a new color.

The third operation 530 represents an example in which a graphic object 532 changed to the new color selected by the user is displayed on the display. For example, when the user selects white from the color selection table 522 by a touch input, or the like, the graphic object 532 with the "THANK" portion changed to white may be displayed. In FIG. 5, although it is illustrated that the user selects the color change icon 514 and then designates a new color, embodiments are not limited thereto, and the color of at least a portion of the graphic object 512 may be changed whenever the user selects the color change icon 514. For example, the color of the "THANK" portion of the graphic object 512 may be changed to a color different from the theme color of the current display mode of the user terminal whenever the user selects the color change icon 514.

In FIG. 5, although it is illustrated that one color change icon 514 is displayed on the display together with the graphic object 512, embodiments are not limited thereto, and two or more color change icons may be displayed. In addition, in FIG. 5, although it is described that the user selects one new color, embodiments are not limited thereto, and the user may select two or more colors to apply a gradation effect to the graphic object 512.

Figure 6:
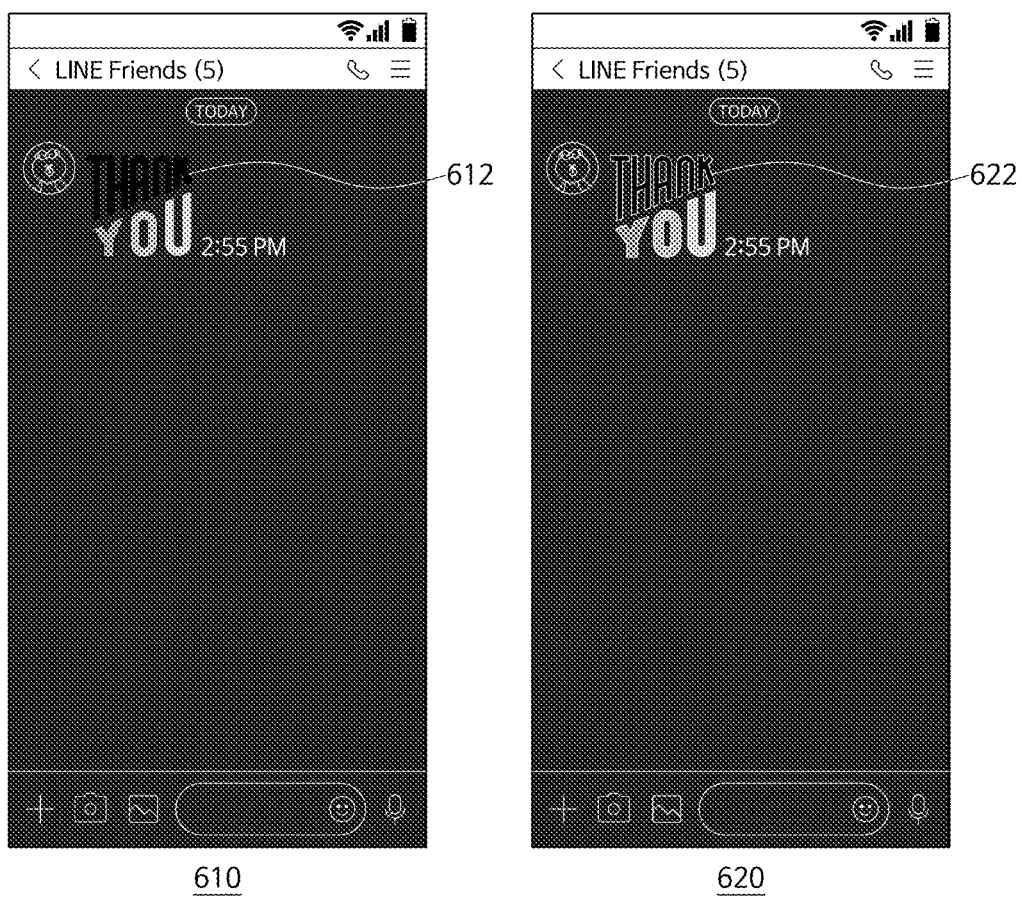
FIG. 6 illustrates an example in which a color of a border area of a graphic object is changed according to an example embodiment.

FIG. 6 illustrates an example in which a color of a border area of a graphic object 612 is changed according to an example embodiment. The user may receive a graphic object transmitted by another user through the chat room on the instant messaging application. In an example embodiment, through a first operation 610 and a second operation 620, the user may view the graphic object with its border area changed in color. In this case, the border area may include a border of the graphic object, a border of each portion (e.g., text portion) of the graphic object, and the like.

The first operation 610 illustrates an example in which the graphic object 612 received from another user is displayed on the display, while the user terminal or the instant messaging application is operating in the second display mode (e.g., dark mode). In this case, the second display mode may have a black theme color, and the text may be displayed in white. In addition, the graphic object 612 may be a sticker on which "THANK YOU" is designed, and may include a border area of each text portion.

The second operation 620 represents an example in which the color of the border area of each portion of the graphic object 612 having a color similar to the theme color of the second display mode is changed and displayed. For example, the color of the border area of the graphic object 612 may be changed to a color different from the theme color of the second display mode and displayed. In this case, the color of the border area of the graphic object 612 may be changed to a color having a complementary color relationship with the theme color of the second display mode. The user may normally identify a graphic object 622 with the border area changed in color in the second display mode.

In an example embodiment, the color of the border area of the graphic object 612 may be automatically changed to a color different from the theme color of the second display mode for a predetermined time (e.g., 1 second, 3 seconds, 5 seconds, and the like) and then may automatically return to the color before the change. That is, the border area of the graphic object 612 may be displayed on the display such that it appears as if the graphic object is momentarily flashing.

In FIG. 6, although it is described that the color of the border area of the graphic object 612 is changed to a color different from the theme color of the second display mode, embodiments are not limited thereto, and a color change icon for the user to change the color of the border area may be displayed on the display. In addition, in FIG. 6, although it is illustrated that the color of the border area of all portions included in the graphic object 612 is changed, embodiments are not limited thereto, and the color of the border area of a portion of the graphic object 612 may be changed.

Figure 7:
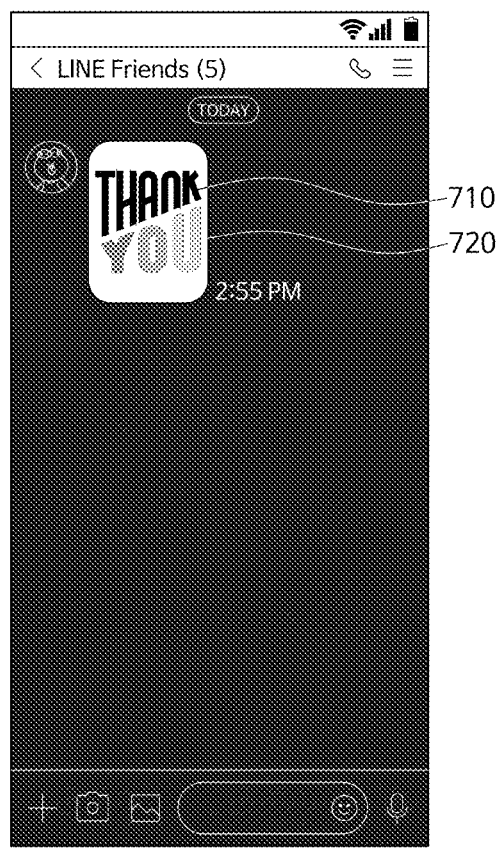
FIG. 7 illustrates an example in which a background layer is displayed on a display together with a graphic object according to an example embodiment.

FIG. 7 illustrates an example in which a background layer 720 is displayed on a display together with a graphic object 710 according to an example embodiment. As illustrated, the user may receive the graphic object 710 including a portion having a color similar to the theme color of the second display mode (e.g., dark mode) being operated in the user terminal. For example, the graphic object 710 may be one that is designed for the first display mode.

In an example embodiment, when the graphic object 710 for the first display mode is received while the user terminal is operating in the second display mode, the graphic object 710 may be displayed on the display together with the background layer 720. In this case, the color of the background layer 720 may be the color (e.g., complementary color) that is different from the theme color of the first display mode or the theme color of the second display mode. For example, the graphic object 132 may be displayed together with the white background layer 720 such that the user can recognize the content.

In FIG. 7, it is illustrated that the shape of the background layer 720 is a rectangle, but embodiments are not limited thereto. For example, the background layer may include a predetermined shape such as a pentagon, a hexagon, a circle, or the like. In another example, the background layer may be generated based on the shape of the graphic object, the shape of the border area of the graphic object, and the like. In addition, in FIG. 7, although it is illustrated that the background layer 720 is displayed in white, embodiments are not limited thereto, and it may be changed to any color different from the theme color of each portion of the graphic object and the display mode. In addition, the user may also select and change the color of the background layer 720.

Figure 8:
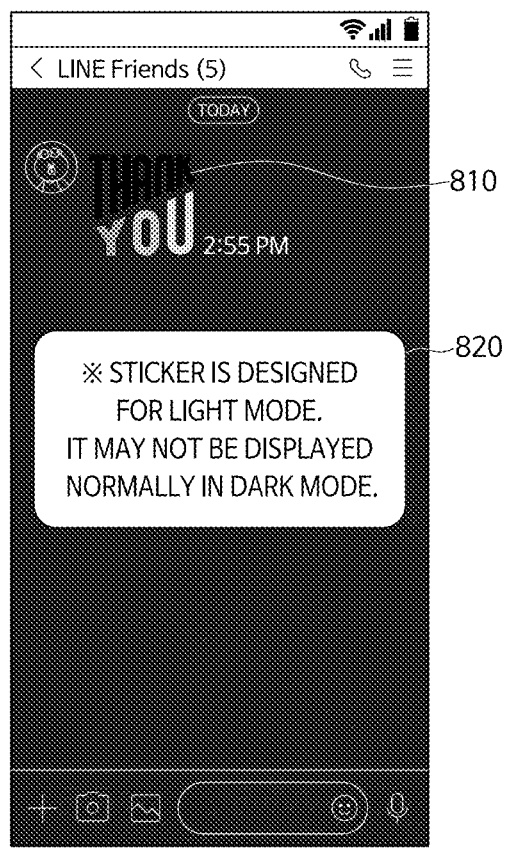
FIG. 8 illustrates an example in which a warning message is displayed in response to determining that a received graphic object is not compatible with the display mode being operated in the user terminal.

FIG. 8 illustrates an example in which a warning message 820 is displayed in response to determining that a received graphic object 810 is not compatible with the display mode being operated in the user terminal. In an example embodiment, the user may receive the graphic object 810 transmitted by another user through the chat room on the instant messaging application. For example, the graphic object 810 may be a sticker designed for a light mode, which may be difficult to normally identify the content in the dark mode.

In an example embodiment, while the user terminal (or instant messaging application) is operating in the dark mode, when the graphic object 810 for the light mode is received, the warning message 820 may be displayed on the display. For example, the graphic object 810 may be a graphic object including a "THANK" portion having the same or similar color to the theme color of the dark mode. In this case, the warning message 820 may include content for notifying the user that it may be difficult for the user to identify the color of at least a portion of the received graphic object 810. For example, the warning message 820 may include content such as "Sticker is designed for light mode. It may not be displayed normally in dark mode."

In an example embodiment, after the warning message 820 is displayed, the user may change the color of at least a portion of the graphic object 810 or change the display mode from the dark mode to the light mode, in order to view the content of the received graphic object 810. Alternatively, after the user terminal displays the warning message 820, the color of at least a portion of the graphic object 810 may be automatically changed. For example, the user terminal may change the color of at least a portion of the graphic object 810 according to the various examples described above.

In FIG. 8, although it is illustrated that the warning message 820 is displayed on the display when the graphic object 810 for the light mode is received while the user terminal is operating in the dark mode, embodiments are not limited thereto. Conversely, the warning message may be displayed on the display when a graphic object for the dark mode is received while the user terminal is operating in the light mode. Additionally, when the display mode is changed to the dark mode after the graphic object for the light mode was received at the user terminal that was operating in the light mode, the warning message may also be displayed. With this configuration, the user can easily recognize that the content of the received graphic object may not be normally viewable in the current display mode.

Figure 9:
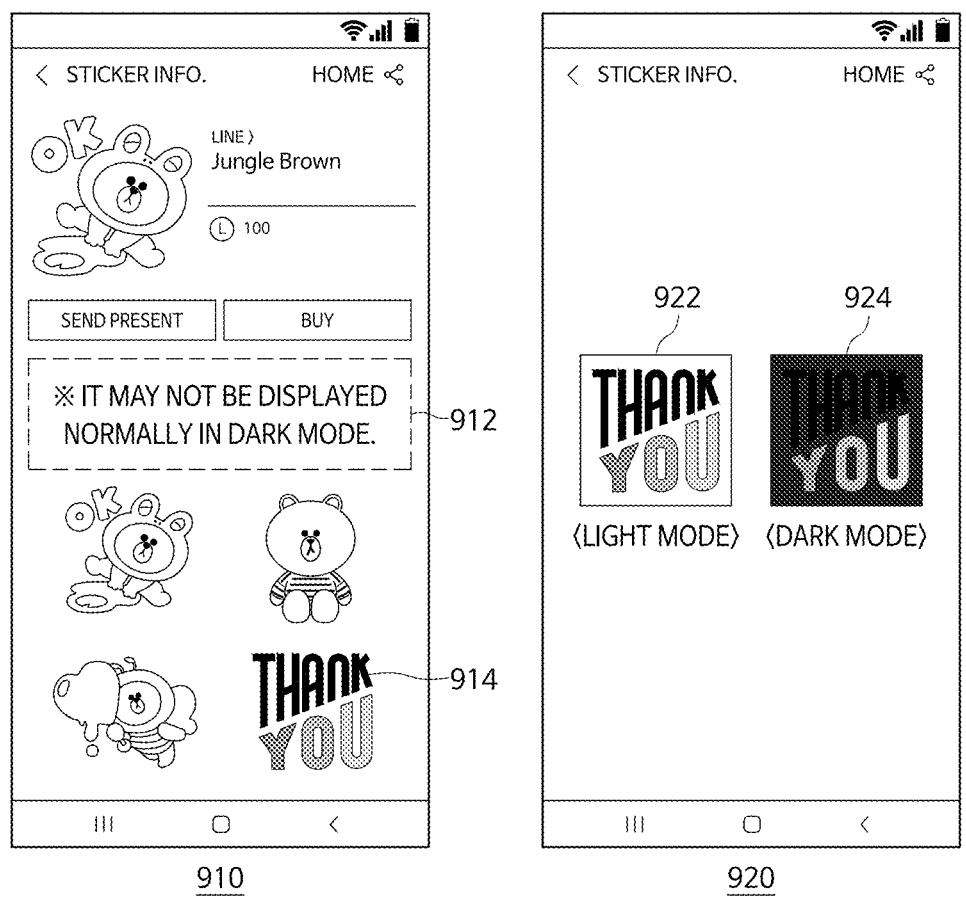
FIG. 9 illustrates an example in which a user purchases a graphic object according to an example embodiment.

FIG. 9 illustrates an example in which a user purchases a graphic object according to an example embodiment. The user may purchase a set of graphic objects from a sticker store or the like provided by the instant messaging application. In an example embodiment, through a first operation 910 and a second operation 920, the user may purchase and use a new graphic object such as a sticker and the like.

The first operation 910 illustrates an example in which the user views one set of graphic objects in a sticker store or the like. As illustrated, the set of graphic objects may include a plurality of graphic objects. The user may purchase a set of graphic objects displayed on the screen or send it to another user as a present.

In an example embodiment, when a set of graphic objects is designed for light mode, a warning message 912 may be displayed on the display. At this time, the warning message 912 may include a phrase for informing that all or some of the graphic objects included in the set of graphic objects may be difficult to identify in a specific display mode. For example, the warning message 912 may include content such as "It may not be displayed normally in dark mode." Conversely, when a set of graphic objects is designed for use in both light and dark modes, an introduction such as "It can be used normally in both light and dark modes" and the like may be displayed.

The second operation 920 illustrates an example of simulating a graphic object 914 displayed in each display mode, in response to the user selecting one graphic object 914. For example, when the user selects "THANK YOU" graphic object 914 by a touch input or the like, a preview of a graphic object 922 in the light mode and a graphic object 924 in the dark mode may be displayed on the display. With such a configuration, the user is able to view in advance how the set of graphic objects the user is purchasing will be displayed in the light mode and the dark mode, respectively. Although not illustrated, the user may change at least some colors of the set of graphic objects the user is purchasing in the light mode or the dark mode by using the color selection table displayed on the user terminal.

Figure 10:
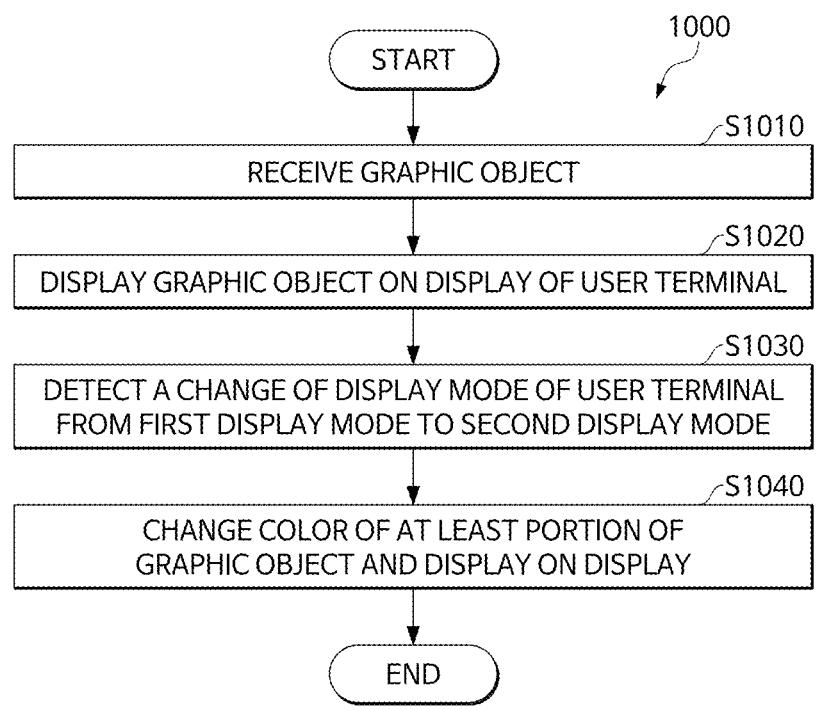
FIG. 10 is a flowchart illustrating a method for providing a graphic object based on a display mode according to an example embodiment.

FIG. 10 is a flowchart illustrating a method 1000 for providing a graphic object based on a display mode according to an example embodiment. The method 1000 for providing a graphic object based on a display mode may be performed by the user terminal (e.g., at least one processor of the user terminal). The method 1000 for providing a graphic object based on a display mode may be started by the processor receiving the graphic object, in operation S1010. For example, the graphic object may be received through the instant messaging application.

The processor may display the graphic object on the display of the user terminal, in operation S1020. For example, the graphic object may be displayed within the chat room of the instant messaging application. In this case, the graphic object may be an image, a sticker, and the like including one or more portions displayed in different colors, and may be related to a specific subject.

The processor may detect a change of the display mode of the user terminal from the first display mode to the second display mode, in operation S1030. In addition, in response to detecting the change of the display mode of the user terminal from the first display mode to the second display mode, the processor may change the color of at least a portion of the graphic object and display it on the display, in operation S1040.

For example, the graphic object may include a graphic object for the first display mode and a graphic object for the second display mode, and the processor may display the graphic object for the second display mode in response to detecting the change of the display mode of the user terminal from the first display mode to the second display mode. In another example, the processor may display, adjacent to the first portion, a color change icon for changing a color of the first portion of the graphic object. Then, the processor may receive a user input for selecting the color change icon, and change the color of the first portion based on the received user input. The color change icon may be displayed in response to determining that the theme color of the second display mode and the color of the first portion have a color difference equal to or less than a predetermined threshold value. In still another example, the processor may change the color of a second portion of the graphic object to a color different from the theme color of the second display mode. In still another example, the processor may change the color of the border area of the graphic object to a color different from the theme color of the second display mode. In still another example, the processor may change the color of the border area of a text portion of the graphic object to a color different from the theme color of the second display mode.

Figure 11:
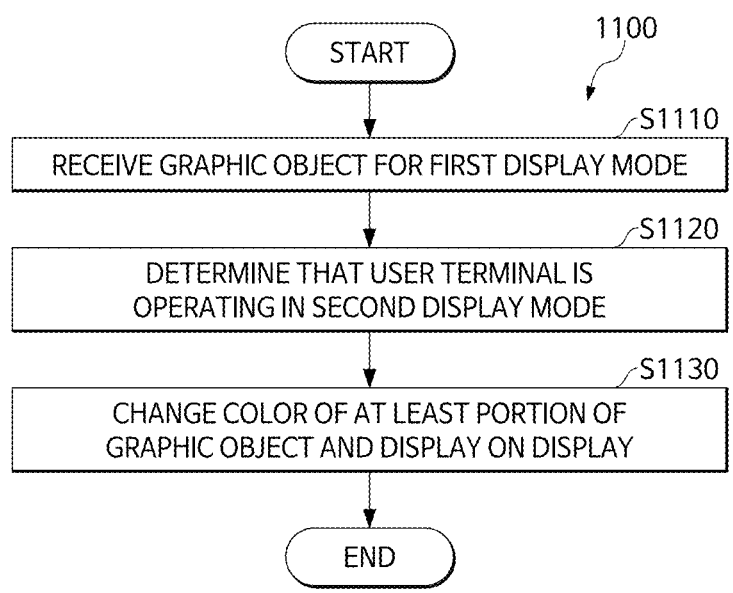
FIG. 11 is a flowchart illustrating a method for providing a graphic object based on a display mode according to an example embodiment.

FIG. 11 is a flowchart illustrating a method 1100 for providing a graphic object based on a display mode according to an example embodiment. The method 1100 for providing a graphic object based on a display mode may be performed by the user terminal (e.g., at least one processor of the user terminal). The method 1100 for providing a graphic object based on a display mode may be started by the processor receiving the graphic object for the first display mode, in operation S1110. For example, the graphic object may be received through the instant messaging application.

The processor may determine that the user terminal is operating in the second display mode, in operation S1120. In addition, in response to determining that the user terminal is operating in the second display mode, the processor may change the color of at least a portion of the graphic object and display the result on the display of the user terminal, in operation S1130. In this case, the graphic object may be displayed within the chat room of the instant messaging application.

In an example embodiment, the processor may display, adjacent to the first portion, a color change icon for changing a color of the first portion of the graphic object. Then, the processor may receive a user input for selecting the color change icon, and change the color of the first portion based on the user input. Additionally or alternatively, the processor may change the color of a second portion of the graphic object to a color different from the theme color of the second display mode. In addition, the processor may change the color of the border area of the graphic object to a color different from the theme color of the second display mode.

The method described above may be provided as a computer program stored in a computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magnetic-optical medium such as a floptical disk, and a ROM, a RAM, a flash memory, and so on. In addition, other examples of the medium may include an app store that distributes applications, a site that supplies or distributes various software, and a recording medium or a storage medium managed by a server.

The methods, operations, or techniques of this disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies depending on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the disclosure, computer, or a combination thereof.

Accordingly, various example logic blocks, modules, and circuits described in connection with the disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of the configurations.

In the implementation using firmware and/or software, the techniques may be implemented with instructions stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, and the like. The instructions may be executable by one or more processors, and may cause the processor(s) to perform certain aspects of the functions described in the present disclosure.

Although the embodiments described above have been described as utilizing aspects of the currently disclosed subject matter in one or more standalone computer systems, embodiments are not limited thereto, and may be implemented in conjunction with any computing environment, such as a network or distributed computing environment.

Furthermore, the aspects of the subject matter in the present disclosure may be implemented in multiple processing chips or devices, and storage may be similarly influenced across a plurality of devices. Such devices may include PCs, network servers, and portable devices.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method for providing a graphic object based on a display mode, the method performed by at least one processor of a user terminal and comprising:
   receiving the graphic object;
   displaying the graphic object on a display of the user terminal;
   detecting a change of the display mode of the user terminal from a first display mode to a second display mode;
   in response to detecting the change of the display mode of the user terminal from the first display mode to the second display mode, changing a background color of the display of the user terminal from a theme color of the first display mode to a theme color of the second display mode; and
   in response to detecting the change of the display mode of the user terminal from the first display mode to the second display mode, changing a color of at least one portion of the graphic object,
   wherein the changing the color of the at least one portion of the graphic object comprises:
   displaying, adjacent to the at least one portion of the graphic object, a color change icon for changing the color of the at least one portion of the graphic object,
   wherein the color change icon is displayed in response to determining that a theme color of the second display mode and the color of the at least one portion have a color difference equal to or less than a predetermined threshold value, and
   wherein the color change icon is not displayed in response to determining that the theme color of the second display mode and the color of the at least one portion have a color difference greater than the predetermined threshold value.

2. The method according to claim 1, wherein the changing the color of the at least one portion of the graphic object further comprises:
   receiving a user input for selecting the color change icon; and
   changing the color of the at least one portion based on the user input.

3. The method according to claim 1, wherein
   the graphic object comprises a first graphic object for the first display mode and a second graphic object for the second display mode,
   the displaying the graphic object on the display of the user terminal further comprises displaying the first graphic object for the first display mode, and
   the changing the color of the at least one portion of the graphic object comprises displaying the second graphic object for the second display mode.

4. The method according to claim 1, wherein the first display mode and the second display mode have theme colors different from each other.

5. The method according to claim 1, wherein the changing the color of the at least one portion of the graphic object further comprises changing the color of the at least one portion of the graphic object to a color different from a theme color of the second display mode.

6. The method according to claim 5, wherein the color different from the theme color of the second display mode has a complementary color relationship with the theme color of the second display mode.

7. The method according to claim 5, wherein the color of the at least one portion has a color difference equal to or less than theft predetermined threshold value from the theme color of the second display mode.

8. The method according to claim 1, wherein the changing the color of the at least one portion of the graphic object further comprises changing a color of a border area of the graphic object to a color different from a theme color of the second display mode.

9. The method according to claim 8, wherein the color of the border area of the graphic object is changed to the color different from the theme color of the second display mode for a predetermined time, and then returns to the color before the change after the predetermined time.

10. The method according to claim 1, wherein
    the graphic object comprises a text, and
    the method further comprises changing a color of a border area of the text to a color different from a theme color of the second display mode.

11. The method according to claim 1, wherein
    the graphic object is received through an instant messaging application, and
    the graphic object is displayed in a chat room of the instant messaging application.

12. A method for providing a graphic object based on a display mode, the method performed by at least one processor of a user terminal and comprising:
    receiving the graphic object for a first display mode, wherein a background color for the first display mode is displayed in a theme color of the first display mode;
    determining that the user terminal is operating in a second display mode, wherein a background color for the second display mode is displayed in a theme color of the second display mode; and
    in response to determining that the user terminal is operating in the second display mode, changing a color of at least one portion of the graphic object,
    wherein the changing the color of the at least one portion of the graphic object comprises:
    displaying, adjacent to the at least one portion of the graphic object, a color change icon for changing the color of the at least one portion of the graphic object,
    wherein the color change icon is displayed in response to determining that a theme color of the second display mode and the color of the at least one portion have a color difference equal to or less than a predetermined threshold value, and
    wherein the color change icon is not displayed in response to determining that the theme color of the second display mode and the color of the at least one portion have a color difference greater than the predetermined threshold value.

13. The method according to claim 12, wherein the changing the color of the at least one portion of the graphic object further comprises:
    receiving a user input for selecting the color change icon; and changing the color of the at least one portion based on the user input.

14. The method according to claim 12, wherein the changing the color of the at least one portion of the graphic object further comprises changing the color of the at least one portion of the graphic object to a color different from a theme color of the second display mode.

15. The method according to claim 12, wherein the changing the color of the at least one portion of the graphic object further comprises changing a color of a border area of the graphic object to a color different from a theme color of the second display mode.

16. The method according to claim 12, wherein
 the graphic object is received through an instant messaging application, and
 the graphic object is displayed in a chat room of the instant messaging application.

17. A non-transitory computer-readable recording medium storing instructions that, when executed by the at least one processor, cause the at least one processor to perform the method according to claim 1.

18. A user terminal, comprising:
 a display;
 a memory storing computer-readable instructions; and
 at least one processor configured to execute the computer-readable instructions to:
 receive a graphic object;
 display the graphic object on the display;
 detect a change of a display mode of the user terminal from a first display mode to a second display mode;
 in response to detecting the change of the display mode of the user terminal from the first display mode to the second display mode, change a background color of the display of the user terminal from a theme color of the first display mode to a theme color of the second display mode; and
 in response to detecting the change of the display mode of the user terminal from the first display mode to the second display mode, change a color of at least one portion of the graphic object,
 wherein the changing the color of the at least one portion of the graphic object comprises:
 displaying, adjacent to the at least one portion of the graphic object, a color change icon for changing the color of the at least one portion of the graphic object,
 wherein the color change icon is displayed in response to determining that a theme color of the second display mode and the color of the at least one portion have a color difference equal to or less than a predetermined threshold value, and
 wherein the color change icon is not displayed in response to determining that the theme color of the second display mode and the color of the at least one portion have a color difference greater than the predetermined threshold value.

19. The user terminal according to claim 18, wherein the changing the color of the at least one portion of the graphic object further comprises:
 receiving a user input for selecting the color change icon; and
 changing the color of the at least one portion based on the user input.

* * * * *